No. 659,110. Patented Oct. 2, 1900.
I. N. SMITH.
HALTER.
(Application filed Jan. 15, 1900.)
(No Model.)

Witnesses:
F. L. Durand
E. P. Bringea

Inventor:
Isaac N. Smith,
By Louis Bagger & Co.
Attorneys

UNITED STATES PATENT OFFICE.

ISAAC N. SMITH, OF ASHLEY, ILLINOIS.

HALTER.

SPECIFICATION forming part of Letters Patent No. 659,110, dated October 2, 1900.

Application filed January 15, 1900. Serial No. 1,558. (No model.)

*To all whom it may concern:*

Be it known that I, ISAAC N. SMITH, a citizen of the United States, residing at Ashley, in the county of Washington and State of Illinois, have invented new and useful Improvements in Halters, of which the following is a specification.

My invention relates to halters for animals; and the objects of the same are to produce a strong, durable, and inexpensive halter which will be cool, comfortable, and not liable to gall the animal and which will be easy upon the animal under favorable conditions, but which would become quite severe provided any undue pull or strain should be exerted on the hitching-strap. I attain these objects by means of the construction shown in the accompanying drawings, in which—

Figure 1:
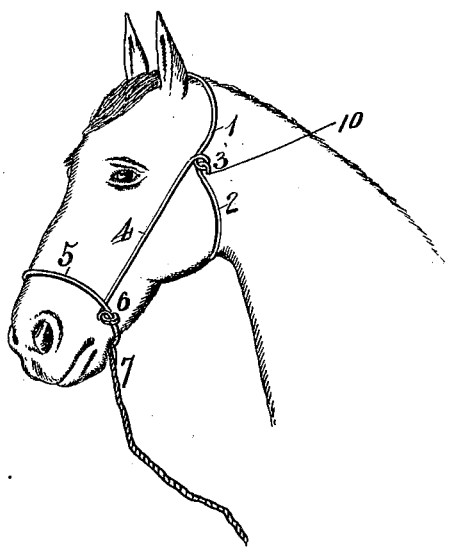
Figure 2:
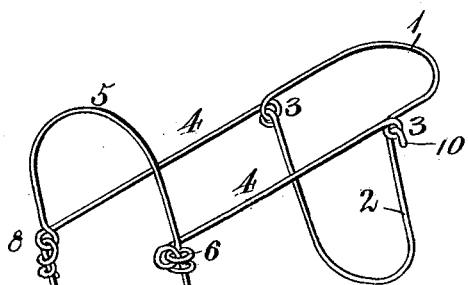
Figure 3:
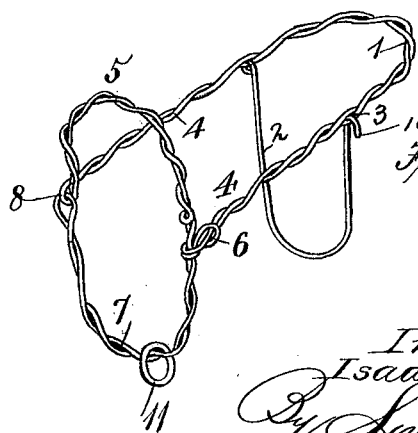

Figure 1 is a view of my halter applied to a horse. Fig. 2 is a perspective view of the halter removed from the animal. Fig. 3 is a view in perspective of a modified form of my halter.

In making up my halter I use metal wire of the proper size or gage, and good results may be attained by using half-round or flattened wire of the required size. I prefer to use galvanized-iron or tinned wire, although copper or even brass wire may be resorted to.

A wire halter such as I propose is easy and comfortable to the animal, does not sweat, chafe, or gall, is light and cool, and under ordinary conditions is desirable in breaking fractious horses. The only time when the halter is severe is when the animal becomes unruly and a pull is exerted on the leading-strap. The nose-band then binds tightly and causes considerable pain until the animal is subdued, when the halter again resumes its original condition of ease and comfort to the animal, and it is not long before it comes to a realization of the fact that submission means comfort.

As shown in Fig. 1, my halter is made up of two lengths of wire, one forming the head-stall and nose-band and the other forming the throat-latch. The headstall 1 is curved at the top or crown, and at the desired point to attach the throat-latch 2 loops or eyes 3 are formed in the wire strand. The cheek-strands 4 extend thence to the proper point to form the nose-band 5, for which purpose the wire is bent into an eye 6, extended thence in a curved line to form the chin-strand 7, and connected to the eye 8 in the opposite cheek-strand, which in turn is bent to form the nose-strand 5 and connected to the eye 6 in the opposite cheek-strand. The throat-latch is formed of a separate strand of wire and is permanently connected at one end to one of the eyes 3 and detachably connected to the other, as by a hook 10 or some similar fastening. A ring 11 may be connected to the chin-strand 7 for attachment of a hitching strap or rope.

As shown in Fig. 3, the halter is made up of twisted wires, and this construction is particularly desirable for wild and unruly animals.

I propose to make these halters in different sizes to fit different-sized animals; but it will be understood that owing to the flexibility of the wire the various parts of the halter may be bent to fit heads and noses of different contours.

Having thus fully described my invention, what I claim is—

A halter made of wire and consisting of a head-stall, two cheek-strands, a chin-strand and a nose-band all formed from a single length of wire, a loop formed in each cheek-strand, a throat-latch made of another piece of wire, one end of which is hinged to the loop in one of the cheek-strands and provided with a hook for engagement with the loop in the other cheek-strand, a ring sliding on the chin-strand, and a leading-rope attached to the ring, said halter adapted to control a fractious animal by a pull upon the leading-rope to tighten the nose-band, substantially as described.

In testimony whereof I have hereunto set my hand in presence of two subscribing witnesses.

ISAAC N. SMITH.

Witnesses:
T. W. BROWN,
B. E. LIVESAY.